G. S. ANDERSON & W. ADAMS.
Insect Destroyers.

No. 154,820.  Patented Sept. 8, 1874.

WITNESSES.
J. W. Garver
Frank Claudy

INVENTORS.
G. S. Anderson
Wm. Adams
per
F. A. Lehmann, Atty.

UNITED STATES PATENT OFFICE.

GEORGE S. ANDERSON AND WILLIAM ADAMS, OF JEFFERSONVILLE, IND.

IMPROVEMENT IN INSECT-DESTROYERS.

Specification forming part of Letters Patent No. 154,820, dated September 8, 1874; application filed August 11, 1874.

*To all whom it may concern:*

Be it known that we, GEORGE S. ANDERSON and WILLIAM ADAMS, of Jeffersonville, in the county of Clark and State of Indiana, have invented certain new and useful Improvements in Potato-Bug Machines; and we do hereby declare the following to be a full, clear and exact description of the invention, such as will enable others skilled in the art to which it pertains to make and use it, reference being had to the accompanying drawings, which form part of this specification.

Our invention relates to an improved machine for cleaning bugs from plants; and it consists in the arrangement and combination of devices, which will be more fully described hereafter, whereby bugs are cleaned from potato and other such plants without injury to the plants.

Figure 1:
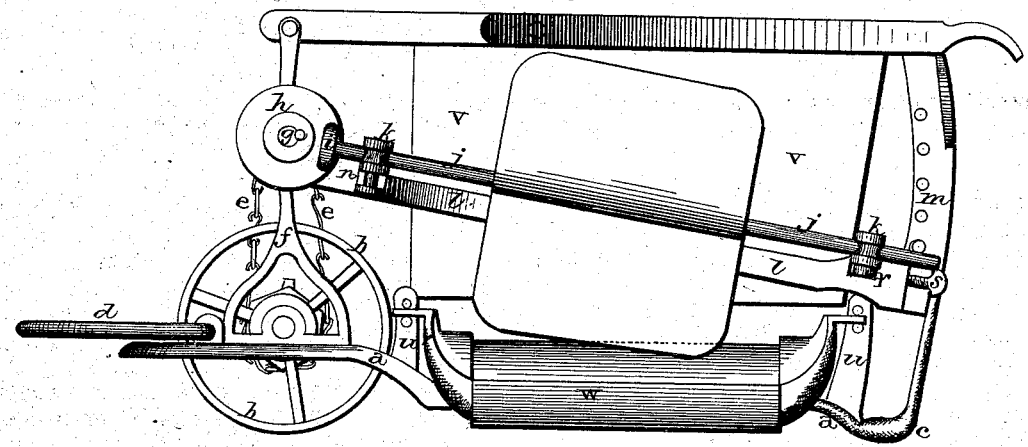
Figure 2:
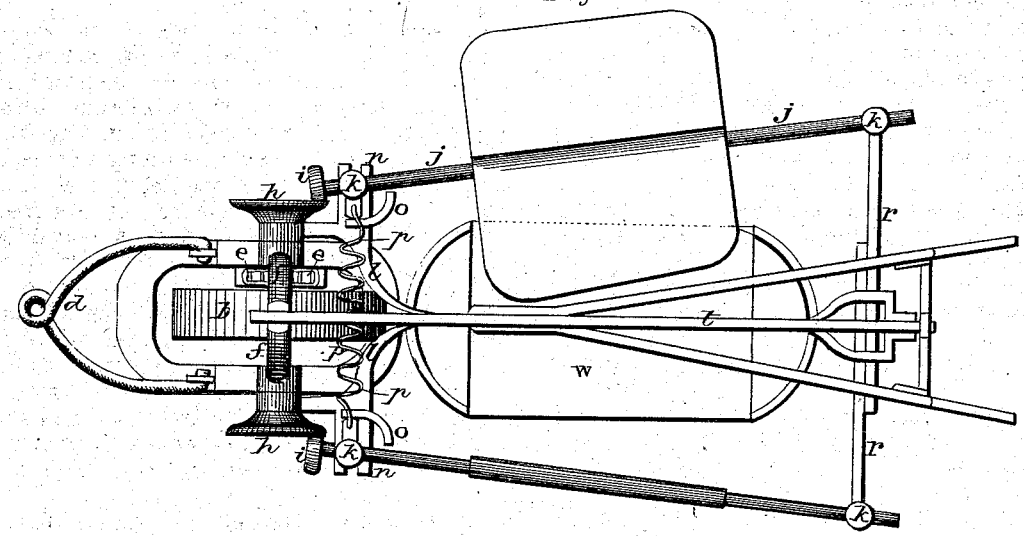
Figure 3:
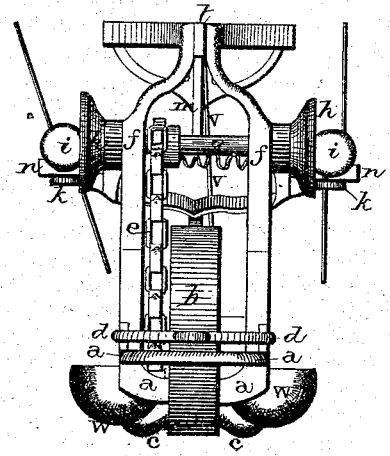

Figure 1 is a side elevation of our invention. Fig. 2 is a plan view of the same. Fig. 3 is a front elevation.

*a* represents a frame of any suitable shape or construction, which is supported at its front end by the driving-wheel *b*, and at its rear end by the runners or other similar devices *c*. To the front end of the frame is pivoted a clevis, *d*, by means of which the machine is attached to an animal, to be drawn between the rows of plants. Upon the shaft of the driving-wheel is placed a spur-wheel, around which passes a driving-chain, *e*, which communicates motion to the shaft *g*, placed above the wheel *b*, and journaled in the standards *f*. Upon each end of this shaft is placed a suitable friction-wheel, *h*, against the sides of which bear the small friction-wheels *i*, having their surfaces covered with leather or rubber, and secured to the front ends of the two revolving fan-shafts *j*. These shafts are journaled at each end in the pivots *k*, so that the shafts can be placed at any angle in relation to the frame, without interfering with their revolutions. Pivoted upon the shaft *g* is a frame, *l*, or perch-bar, which is made long enough to extend the full length of the machine, and has its rear end made adjustable up and down upon the standard *m*, which is provided with a series of holes, so that the fans on the fan-shafts can be adjusted to suit a different growth of plants. Extending out from the sides of this frame at the front end are the slotted or forked projections *n*, in which the pivots *k* are placed, and the stops *o* against which the fan-shafts strike as they are moved inward, so as to throw the wheels *h i* out of gear and thus stop the revolutions of the fans. The two pivots through which the shafts pass at their front ends are held together by means of a suitable spring, *p*, of sufficient tension to always keep the wheels *i* pressed against their driving-wheels *h*, the slots in the projections *n* being of such a length as to allow the pivots to be freely moved back and forth as the wheels are thrown in and out of gear.

The pivots for the rear ends of the shafts are attached to sliding rods *r*, by means of which the shafts can be opened outward, so as to accommodate the fans to different widths of rows, the rods being held in any desired position by a set-screw or clamping device, *s*.

Supported upon the standards *f m* is a beam, *t*, to which the handles are secured, and from the under side of which is suspended a curtain, *v*, which prevents the fans from brushing the bugs too far over to one side.

Projecting upward from the top of the frame *a* are two standards, *u*, upon which is supported the double trough *w*, into which the bugs are swept by the fans. As this trough is only held in position by means of catches, the trough can be removed at will.

Having thus described our invention, we claim—

1. The combination of the fan-shafts *j*, frame *l*, standard *m*, pivots *k*, and rods *r*, whereby the fan-shafts can be adjusted, both vertically and horizontally, to suit the width of the rows and the height of the plants, substantially as described.

2. The combination of the frame *l*, provided with the stops *o*, with the fan-shafts *j*, whereby the wheels *h i* are thrown out of gear, substantially as shown.

3. The combination of the frame *l*, provided with the slotted projections *n*, with the pivots *k*, fan-shafts *j*, springs *p*, and wheels *h i*, substantially as specified.

In testimony that we claim the foregoing we have hereunto set our hands this 1st day of August, 1874.

GEORGE S. ANDERSON.
WILLIAM ADAMS.

Witnesses:
E. HAWLEY,
HOWARD JOHNSTON.